Sept. 22, 1959     D. M. SMYTH ET AL     2,905,740
SOLID ELECTROLYTE BATTERY CELL
Filed May 27, 1957
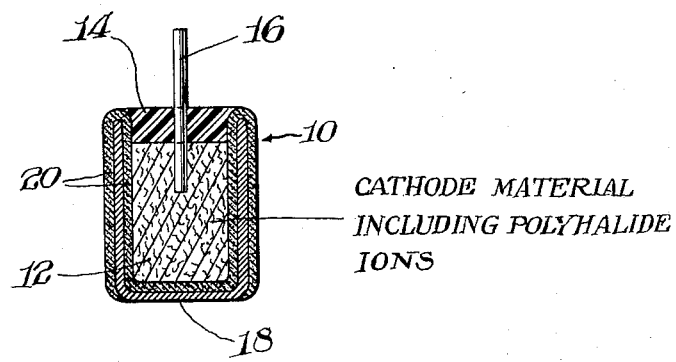
INVENTORS
*Donald M. Smyth*
*George A. Shirn*
BY *Connolly and Hutz*
ATTORNEYS

United States Patent Office 2,905,740
Patented Sept. 22, 1959

2,905,740

SOLID ELECTROLYTE BATTERY CELL

Donald M. Smyth and George A. Shirn, Williamstown, Mass., assignors to Sprague Electric Company, North Adams, Mass., a corporation of Massachusetts Application May 27, 1957, Serial No. 661,598

15 Claims. (Cl. 136—83)

This invention relates to a solid electrolyte battery cell including metallic electron donor anode material and nonmetallic electron acceptor cathode material, and more particularly relates to a solid electrolyte battery cell in which the active constituent of the cathode material is a halogen.

Some of the potential advantages of solid electrolyte battery cells over conventional battery cells are a long shelf life and stability over a wide range of operating temperatures. However, it has been found difficult to provide these attributes in significant magnitudes concomitant with relatively high E.M.F.

An object of this invention is to provide a primary battery cell of the solid electrolyte type which has an extended shelf life, stability over a wide range of temperature together with a relatively high E.M.F.

In accordance with this invention, it has been discovered that a battery cell which has an extended shelf life, temperature stability, and yields a relatively high E.M.F. can be provided by assembling a metallic electron donor anode with cathode material including a polyhalide. This polyhalide cathode material includes anions in which an available halogen is coordinated or covalently bonded to a central halogen atom. This anion gradually dissociates to liberate the available halogen in vapor form. This gradual liberation provides a highly advantageous low pressure source of halogen vapor, which enhances shelf life and stability particularly at high temperatures. Furthermore, this availability of halogen at low pressure, makes it possible to utilize a relatively nonmetallic or reactive halogen, such as chlorine. A relatively high E.M.F. concomitant with extended shelf life and temperature stability can accordingly be achieved.

Silver has been found to be a useful anode material for solid electrolyte cells, and silver chloride in conjunction therewith has demonstrated excellent solid barrier electrolyte properties. A particularly effective example of a solid electrolyte battery cell, therefore, includes these components in conjunction with polyhalide cathode material which gradually dissociates and provides available chlorine vapor at a relatively low pressure. This provides a solid electrolyte battery cell inherently having the aforementioned beneficial attributes in addition to having a self-healing or automatically renewing electrolyte by virtue of the spontaneous combination or reaction of the anode and cathode material if a rupture or break should materialize in the electrolyte film.

A better and more complete understanding of this invention may be obtained by reference to the following detailed description in conjunction with the accompanying drawing in which the single figure is a cross-sectional view of one embodiment of this invention, of the type of constituent and mode of arrangement which provides the aforementioned advantages and to specific examples of some particularly advantageous constituents and combinations thereof.

As disclosed, for example, in U.S. Letters Patent No. 2,696,513, it has been found advantageous to utilize electron donor anodes of silver in solid electrolyte batteries. Silver, itself, is convenient because it does not readily form an oxide film in air. It is also advantageous because silver halide films are easily formed by the tarnishing of silver in halogen vapor or by anodic halogenation in aqueous halide solutions. Unsupported electrolyte films of silver chloride can even be shaped and formed, for example, by cold rolling. The properties of these halide films are significant because halogens are good electron acceptor cathode materials for solid electrolyte battery cells. Furthermore, silver-halogen solid electrolyte battery cells have unexpectedly high E.M.F. in view of the fact that silver is itself not a particularly active metal. The E.M.F.'s, under standard conditions of 25° C. at one atmosphere of halogen pressure of battery cells including silver as the anode and a halogen as the cathode are as follows:

(1) Silver-iodine=0.79 volt
(2) Silver-bromine=1.01 volts
(3) Silver-chlorine=1.13 volts
(4) Silver-fluorine=1.93 volts Another requirement for a useful battery cell is that the cathode vapor pressure be relatively low to prevent disruption of the cell structure by high internal vapor pressures at high temperatures. A cathode material including iodine as the available halogen, therefore, apparently fulfills this requirement because of its fairly low vapor pressure (0.2 mm. at 20° C., 4.3 mm. at 60° C.) and because it is a solid under ordinary conditions. The reacting rate of silver and iodine, however, is too rapid to provide adequate extended shelf life. Since the tarnishing rate of silver and chlorine is relatively slower, it was discovered that silver chloride would provide a satisfactory electrolyte and protective barrier for a silver anode. The silver anode and iodine cathode were, therefore, separated by silver chloride electrolyte materials as disclosed and claimed in U.S. Letters Patent 2,847,493, issued August 12, 1958.

This combination has provided a battery cell having markedly improved characteristics in comparison to other cells known at the time of its discovery, but several disadvantages still existed. The E.M.F. was only 0.69 volt at room temperature, which is the E.M.F. of the Ag-$I_2$ system, and any porosity or physical rupture of the electrolyte film permitted the available iodine to attack the unprotected silver and reduce shelf life.

It was then unexpectedly and opportunely discovered that an available supply of a lighter halogen at relatively low vapor pressure could be provided for use as a cathode material by utilizing a polyhalide anion including an available halogen coordinated or covalently bonded to the central halogen atom.

The fact that a polyhalide ion dissociates to provide a lighter halogen, for example, chlorine at a relatively low vapor pressure, removed a seemingly unsurmountable barrier in the path of utilizing a cathode material whose other characteristics admirably suited it for use as a cathode material. Another unexpected advantage was the fact that the silver chloride electrolyte barrier was now made self-healing or self-renewing. When a silver anode and polyhalide cathode are combined, any break or rupture in the silver chloride electrolyte barrier is automatically healed or reformed by spontaneous reaction of the anode and cathode materials. This even makes it possible to automatically form the electrolyte barrier electrolyte layer by the simple act of placing the cathode material into contact with the silver. However, this is not always done because pretarnishing of the silver by chlorine vapor avoids consumption of the limited amount of active cathode material available in a given cell.

These uniquely efficient polyhalide materials incorporate an anion including an even number of halogen atoms covalently bonded to a central halogen atom, and this anion as a whole bears a single negative charge. The central atom is generally iodine, occasionally bromine, rarely chlorine and never fluorine. The attached atoms are never heavier than the central atom; thus fluorine, chlorine, or bromine, but not iodine, atoms may be attached to a central bromine atom. Since these anions are quite large, their more stable salts are those with large cations such as those of the alkali metals, hydrated alkaline earth metals, ammonium or substituted ammonium ion, or organic amines. The polyhalide salts may be prepared by several techniques such as:

(a) the addition of halogen to a simple halide:

$$KI + Cl_2 = KICl_2$$
$$KI + I_2 = KI_3$$

(b) the addition of an interhalogen to a simple halide:

$$NH_4Cl + ICl = NH_4ICl_2$$
$$NaCl + ICl_3 = NaICl_4$$
$$NaF + ICl_3 = NaIFCl_3$$

(c) the addition of a halogen to a polyhalide:

$$KICl_2 + Cl_2 = KICl_4$$

(d) the addition of an interhalogen to a polyhalide does not appear to work since it involves an unwieldy transfer of charge.

These preparations may be carried out under anhydrous conditions, but it is more convenient to carry out the reactions in aqueous solution. In most preparations, there are no crystalline by-products, so further purification is not necessary. If necessary, the compounds may be purified by recrystallization from alcohol, concentrated hydrochloric acid or glacial acetic acid. In some cases, it is necessary to dissolve some additional halogen or interhalogen in the solvent to suppress decomposition of the salt. A typical and important preparation for this work is as follows as described in an article by F. D. Chattaway and F. L. Garton published in J.C.S. (London) 125, 183 (1924).

Chlorine gas is passed into a strong aqueous solution of KI until the precipitated iodine has redissolved. On cooling, yellow crystals of KICl_4 precipitate and may be filtered out and vacuum dried over a suitable drying agent such as anhydrous CaSO_4 or CaCl_2. A modification of this consists of passing Cl_2 into a solution of KCl to which the calculated amount of crystalline iodine has been added. This reaction may be used to prepare a wide variety of $ICl_4^-$ salts by varying the cation of the initial halide. The same technique is used to prepare fluorotrichloroiodide salts, $MIFCl_3$, by passing chlorine into a solution of the appropriate fluoride plus sufficient crystalline iodine. Alternatively, an alcoholic solution of ICl_3 may be added to a fluoride solution as described in the following articles: H. S. Booth, C. F. Swinehart and W. C. Morris, J.A.C.S. 54, 2561 (1932). H. S. Booth, W. C. Morris and G. D. Swartzell, J.A.C.S. 55, 4466 (1933).

All of these polyhalide salts tend to decompose to a simple halide or a simpler polyhalide plus a halogen or interhalogen. The residual simple halide invariably is that of the lightest halogen atom in the anion. For example, $MICl_4$ (when M is a monovalent cation) ultimately leaves a residue of MCl as does $MICl_2$, but $MIFCl_3$ leaves a residue of MF. It was discovered that this decomposition produces a source of halogen vapor which is ideally suited for use in a solid electrolyte cell.

Salts which liberate a desirable halogen, for example chlorine at a low vapor pressure, are particularly advantageous cathode material constituents. Examples of these salts and their decomposition reactions are as follows:

$$MICl_2 = MCl + ICl$$
$$MIBr_2 = MBr + IBr$$
$$MICl_4 = MICl_2 + Cl_2$$
$$MIF_4 = MF + IF_3$$
$$MIFCl_3 = MIFCl + Cl_2$$
$$MI_3 = MI + I_2$$
$$MIF_6 = MF + IF_5 \text{ etc.}$$

It has also been discovered that the salts of the tetrachloroiodide ion are ideally suited for use in battery cells, and the potassium salt, $KICl_4$, has been found to be highly satisfactory. Measurement has revealed that this salt has a decomposition vapor pressure of 0.82 mm. at 25° C. and attains a decomposition pressure of 1 atmosphere at 125° C. It appears that the decomposition occurs in two steps:

$$KICl_4 = KICl_2 + Cl_2$$
$$KICl_2 = XCl + ICl$$

with the bulk of the pressure being Cl_2. The exact composition of the vapor is not absolutely known, but it has demonstrated itself as a highly efficient source of chlorine for use as a cathode material in solid electrolyte battery cells. Although the aforementioned reactions are theoretically reversible, equilibrium is attained very slowly under conditions of decreasing temperature because the initial recombination of vapor and solid coats the solid with a layer which hinders further recombination. This property further enhances the usefulness of this salt as a cathode material.

A wide variety of $ICl_4^-$ salts have been prepared and these are all useable as a class for the purpose in question. $KICl_4$ and $NH_4ICl_4$ were first made in 1839 (Filhol, J. Pharm. 25, 431, 506 (1839), while the Li+, Na+, Rb+, and Cs+ salts are reported in 1892 and 1893 (Wells et al., Z. Anorg. Chem. 1, 85 (1892); 2, 255 (1893). N-alkyl pyridinium and quinolinium tetrachloroiodides were reported in 1856, and tetraethylammonium and tetra (n-proyl) ammonium tetrachloroiodide have been prepared (Chattaway and Hoyle, J.C.S. (London) 123, 661 (1923). Hydrated salts of such divalent cations as Co++, Ni++, Mn++, Zn++, Be++, Mg++, Ca++, and Sr++ have been prepared (Weinland and Schlegelmilch, Z. Anorg. Chem. 30, 134 (1902). The salts of such organic amines as guanidine, urea and pyridine, α-picoline, quinoline and substituted derivatives of these are reported (F. D. Chattaway and F. L. Garton, J.C.S. (London) 125, 183 (1924). A wide variety of substituted ammonium $ICl_4^-$ salts have been prepared (F. D. Chattaway and G. Hole, J.C.S. (London) 123, 654 (1923). Some diazonium salts have also been mentioned (F. D. Chattaway, F. L. Garton and G. D. Parkes, J.C.S. (London), 125, 1980 (1924).

Alkali metal and organic amine salts of $IFCl_3^-$ have also been described (H. S. Booth, C. F. Swinehart and W. C. Morris, J.A.C.S. 54, 2561 (1932); H. S. Booth, W. C. Morris and G. D. Swartzell, J.A.C.S. 55, 4466 (1933).

None of the salts which dissociate to yield fluorine have been actually tested, but the potentially high E.M.F. of cells including this material conceivably qualifies it as an ideal material if its extremely high reactivity could be adequately controlled.

Some of the other $ICl_4^-$ salts have an appreciably lower dissociation pressure and would, therefore, provide an even longer shelf life. The Rb and Cs salts, for example, have lower dissociation pressures, but they seem to be prohibitively expensive. The tetra substituted ammonium salts or organic amine salts apparently are less expensive materials which can provide such lower dissociation vapor pressures in an economical cell.

*Processing*

The highly advantageous polyhalide constituent of solid electrolyte cell cathode materials is processed, for example, in the following manner to prepare it for use in a battery cell. Ten parts by weight of active material are ground with two parts by weight of high conductivity inert material, for example, carbon black such as Vulcan SC brand of carbon black made and sold by the Godfrey L. Cabot, Inc. This grinding may be accomplished, for example, in a glass ball-mill. The ground mixture is then mixed with twelve parts by weight of a binder made of a poly monochlorotrifluoroethylene grease, for example, Kel–F No. 90 grease, a product of the M.W. Kellogg Co. This grease is composed of polymonochlorotrifluoroethylene oils and waxes thickened with an inert jelling agent. The final mixture forms a putty-like dispersion of the active cathode material and carbon black in an unusually effective grease binder.

The exact composition of the Kel–F No. 90 grease made and sold by the M.W. Kellogg Co. is not known, but it is described as including oils and waxes compounded from low molecular weight polymers of chlorotrifluoroethylene which remain semi-solid between 0° and 350° F. It also includes an inert jelling agent. Its properties are described in detail in a bulletin entitled "Kel–F Fluorocarbon Oils Waxes Greases," copyright 1955, published by the M.W. Kellogg Co., Chemical Manufacturing Division, P.O. Box 469, Jersey City 3, New Jersey.

In this bulletin, it is explained that the oils and waxes form a homologous series with the general formula $Cl\text{---}(CF_2\text{---}CFCl)_x\text{---}Cl$. Vacuum distillation leads to commercial products including vacuum oils and waxes which are selectively blended and thickened with an inert jelling agent to provide Kel–F No. 90 grease having the following properties, for example.

*Properties of Kel–F #90 Grease*

| | |
|---|---|
| Color | Water white. |
| Penetration, ASTM D217–48 | 225–255 worked. |
| Dropping point, ASTM D566–42 | 510 deg. F. |
| Oil Separation: | |
|   120 hrs./212° F., VV–L–791—321.1 | 2.2%. |
|   120 hrs./300° F., VV–L–791—321.1 | 7.9%. |
| Evaporation, 125 hrs./212° F. | 2.2%. |
| Vapor pressure, 77° F | $10^{-3}$ mm. Hg. |
| Oxidation, Norma-Hoffman, 268 hrs./212° F./110 p.s.i.g. $O_2$, ASTM D942–47 | No drop in pressure. |
| Copper corrosion, 1 hr./212° F., VV–L–791–5309.1 | No stain. |
| Work stability, Hain microworker, 100 strokes/250 mesh | No change in penetration. |
| Shell roll test, 4 hours | No change in penetration. |
| Mean Hertz load, Shell E.P. tester | 100 kg. |
| Water stability, MIL–G–3278, 10 minutes | No cloudiness. |
| Water washout, VV –L– 791–3252.1 | 9%. |
| Service temperature | 0° to 350° F. |

This grease binder has been found to be unexpectedly superior to other binders heretofore used, such as latex cement or silicone grease, because of its almost complete inertness to attack by halogen cathode materials under the temperature range encountered by battery cells of the solid electrolyte type, together with additional advantageous characteristics. It maintains its consistency indefinitely over the entire range of operating conditions and temperatures. Furthermore, for some reasons which cannot be entirely explained, less of the polymonochlorotrifluoroethylene binder need be used to impart the desired consistence and physical characteristics to a cathode material than any other known binder. The use of this material, therefore, simultaneously imparts manifold desirable physical, chemical and electrical characteristics to the cathode material. It has been found useful as a binder for the other known halogen cathode materials, such as iodine, as well as for the mixed polyhalides specifically mentioned herein. It should be understood that the binder is utilized principally to provide convenient mechanical or physical properties; and under conditions where a dry cathode mix could be used, a binder is not necessary.

A specific example of a mixture which imparts excellent consistency to the material has been given, but other proportions may be utilized to yield a usable mixture. Mixtures of the following ranges, for example, give excellent results:

| Constituent: | Ranges of percent by weight |
|---|---|
| Active cathode material | 30–50 |
| Carbon Black | 5–10 |
| Grease Binder | 40–60 |

*Incorporation in battery cell*

The aforementioned mixture may be incorporated in a battery cell including a cup-type silver anode 10 of the type disclosed and claimed in copending application, commonly assigned, S.N. 657,178, filed May 6, 1957. In this structure, the cathode material 12 is sealed, for example, within the can by means of a Teflon (duPont tetrafluoroethylene polymers) plug 14, and a cathode contact element 16, for example, a relatively inert lead of tantalum is inserted through the plug 14 into the cathode material 12. Electrical contact is made to the anode, for example, upon the outside of the cup-shaped silver anode, by a lead (not shown) connected to a bare portion 18 at the base of anode 10.

In a solid electrolyte battery cell of the type described in which silver is the anode, and $KICl_4$ is the active cathode material; theoretical shelf lives of 50–100 years at continuous storage temperatures up to 60° C., for example, have been estimated. When the silver anode is preliminarily reacted or tarnished with chlorine, for example, at temperatures from 200–400° C. for a few minutes, a layer 20 of AgCl from five to fifty microns in thickness is formed, for example, which further extends the shelf life of these cells.

What is claimed is:

1. A battery cell including a metallic electron donor anode and electron acceptor cathode material, said cathode material incorporating a polyhalide anion including a central halogen and an available halogen covalently bonded thereto, and said anion having the property of dissociating to provide a vapor of said available halogen.

2. A battery cell as set forth in claim 1 wherein a preformed film of a salt of said available halogen is provided upon said anode.

3. A battery cell as set forth in claim 1 wherein the available halogen of said polyhalide is chlorine.

4. A battery cell as set forth in claim 3 wherein said anode is silver.

5. A battery cell as set forth in claim 3 wherein said polyhalide includes the tetrachloroiodide anion.

6. A battery cell as set forth in claim 5 wherein said polyhalide cathode material essentially consists of a salt of said tetrachloroiodide ion which furnishes the available chlorine at a relatively low pressure which does not disrupt the cell under normal operating conditions.

7. A battery cell as set forth in claim 6 in which said salt is an alkali metal salt of said tetrachloroiodide ion.

8. A battery cell as set forth in claim 7 wherein said salt is potassium tetrachloroiodide.

9. A battery cell as set forth in claim 7 wherein said salt is ammonium tetrachloroiodide.

10. A battery cell as set forth in claim 7 wherein said salt is a hydrated alkaline earth metal salt of tetrachloroiodide.

11. A battery cell as set forth in claim 7 wherein said salt is an organic amine salt of tetrachloroiodide.

12. A battery cell as set forth in claim 7 wherein said salt is a tetrachloroiodide salt of an organic substituted ammonium cation.

13. A battery cell as set forth in claim 1 where said cathode material is mixed with the following materials in ranges of percent by weight as follows:

| Constituent: | Range of percent by weight |
|---|---|
| Active cathode material | 30–50 |
| Finely ground carbon black | 5–10 |
| Monochlorotrifluoroethylene polymer grease (Semi-solid between 0°–350° F.) | 40–60 |

14. A battery cell as set forth in claim 13 wherein a specific example of said composition is made approximately as follows: ten parts by weight of cathode material mixed with two parts by weight of carbon black, and the resultant mixture is blended with twelve parts by weight of said grease.

15. The process of preparing a nonmetallic electron acceptor cathode material of the halogen type for use as a cathode material for solid electrolyte battery cells which comprises the intimate mixture of said material with a minor amount of finely ground conductive material and substantially equal parts by weight of a monochlorotrifluoroethylene polymer grease including an inert jelling agent and which is solid from 0° to 350° F.

References Cited in the file of this patent

UNITED STATES PATENTS

| | | |
|---|---|---|
| 2,696,513 | Lehovec | Dec. 7, 1954 |
| 2,718,539 | Bradshaw et al. | Sept. 20, 1955 |
| 2,793,244 | Van Der Grinten | May 21, 1957 |